(12) United States Patent
Sabraoui et al.

(10) Patent No.: US 11,990,023 B2
(45) Date of Patent: May 21, 2024

(54) METHOD OF PREDICTING THE RISK OF A LIQUID FREEZING

(71) Applicant: SAGEMCOM ENERGY & TELECOM SAS, Rueil Malmaison (FR)

(72) Inventors: Abbas Sabraoui, Rueil Malmaison (FR); Oussama Abid, Rueil Malmaison (FR); Guillaume Lecocq, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 21 days.

(21) Appl. No.: 17/695,625

(22) Filed: Mar. 15, 2022

(65) Prior Publication Data
US 2022/0309907 A1 Sep. 29, 2022

(30) Foreign Application Priority Data

Mar. 25, 2021 (FR) ...................................... 2103048

(51) Int. Cl.
*E03B 7/12* (2006.01)
*G08B 29/18* (2006.01)

(52) U.S. Cl.
CPC .............. *G08B 29/185* (2013.01); *E03B 7/12* (2013.01)

(58) Field of Classification Search
CPC . G08B 29/185; E03B 7/12; E03B 7/10; G01F 15/10; G01F 1/00; G01N 25/20; G01K 13/026; G01K 13/028; G01P 5/245
See application file for complete search history.

(56) References Cited

U.S. PATENT DOCUMENTS

| | | | |
|---|---|---|---|
| 3,534,604 A | 10/1970 | Hook et al. | |
| 6,642,487 B2* | 11/2003 | Stanzel | ..................... H05B 3/84 219/214 |
| 6,987,457 B2* | 1/2006 | Yin | ....................... G08B 21/182 340/580 |
| 10,316,499 B2* | 6/2019 | Van Goor | ............... F24D 19/10 |
| 11,220,947 B2* | 1/2022 | Frehse | ..................... F01N 9/005 |
| 2004/0155151 A1* | 8/2004 | Szilder | .................... B64D 15/20 244/134 F |
| 2011/0233290 A1* | 9/2011 | Borovinov | ........... F24D 19/1012 236/93 R |
| 2014/0000724 A1* | 1/2014 | Park | ......................... E03B 7/08 137/78.1 |

(Continued)

FOREIGN PATENT DOCUMENTS

| | | |
|---|---|---|
| CA | 3124955 A1 | 7/2020 |
| JP | 2003193522 A | 7/2003 |

*Primary Examiner* — Nay Tun
(74) *Attorney, Agent, or Firm* — MUNCY, GEISSLER, OLDS & LOWE, P.C.

(57) ABSTRACT

A prediction method for predicting freezing of a liquid flowing in a pipe of a liquid meter includes steps of: acquiring measurements of air temperature in the liquid meter; evaluating an air temperature prediction parameter and then, from the air temperature prediction parameter, evaluating a liquid temperature prediction parameter; using the liquid temperature prediction parameter to estimate a duration-to-freezing between a present instant and an instant at which the liquid risks freezing; and generating an alarm if the duration-to-freezing is less than a predetermined time threshold.

14 Claims, 3 Drawing Sheets

(56) References Cited

U.S. PATENT DOCUMENTS

| | | | |
|---|---|---|---|
| 2015/0025695 A1* | 1/2015 | Pantelides | G05B 23/0243 |
| | | | 700/282 |
| 2016/0115838 A1* | 4/2016 | Girardi | F01N 9/00 |
| | | | 701/99 |
| 2017/0138023 A1 | 5/2017 | Dooley et al. | |
| 2017/0362801 A1* | 12/2017 | Van Goor | F24D 19/10 |
| 2020/0018537 A1* | 1/2020 | Miwa | F25B 49/02 |
| 2020/0080878 A1* | 3/2020 | Banerjee | E03B 7/12 |
| 2022/0309907 A1* | 9/2022 | Sabraoui | E03B 7/12 |

\* cited by examiner

METHOD OF PREDICTING THE RISK OF A LIQUID FREEZING

The invention relates to the field of liquid meters.

BACKGROUND OF THE INVENTION

Cold periods in winter regularly subject water pipes to difficult situations. There is a real danger if the water contained in the pipes freezes. The volume of the water then increases, which can lead to the appearance of cracks in or even to the destruction of pipes, pipework, or indeed water meters.

Those kinds of damage represent not only a real problem for the water distributor, but also for clients who are not only deprived of water, but can sometimes also be constrained to make repairs at their own expense.

Certain existing water meters evaluate the risk of freezing by measuring the temperature of the water, by comparing the temperature of the water with a predetermined threshold (e.g. equal to 3° C.), and by generating an alarm when the water temperature becomes lower than the predetermined threshold.

That method presents the following drawbacks.

Since the alarm is generated when the water temperature drops below a predetermined threshold, clients generally do not have enough time to take appropriate measures to protect water meters and their installations.

Furthermore, that method is not very reliable and presents a high risk of "false positives". Thus, it can happen that water, when flowing at a certain rate, reaches a temperature close to 0° C. without freezing, e.g. when the meter is installed indoors and the water is coming in from the outside. Under such circumstances, taking account only of the temperature of the water in order to detect freezing gives rise to a false alarm being generated, which is clearly inconvenient both for the distributor and for clients.

OBJECT OF THE INVENTION

An object of the invention is to predict the risk of freezing for a liquid flowing in the pipe of a meter, and to do so in a manner that is reliable and early enough to enable the distributor or clients take action.

SUMMARY OF THE INVENTION

In order to achieve this object, there is provided a prediction method for predicting freezing of a liquid flowing in a pipe of a liquid meter, the method comprising the steps of:
acquiring measurements of air temperature in the liquid meter;
from the air temperature measurements, evaluating an air temperature prediction parameter representative of future variation of air temperature;
from the air temperature prediction parameter, evaluating a liquid temperature prediction parameter representative of future variation of liquid temperature;
using the liquid temperature prediction parameter to estimate a duration-to-freezing between a present instant and an instant at which the liquid risks freezing;
generating an alarm if the duration-to-freezing is less than a predetermined time threshold.

When ambient temperature decreases, the temperature of the air inside the liquid meter decreases more quickly than the temperature of the liquid flowing in the pipe of the meter. This is due to the difference in thermal inertia between water and air.

Using the air temperature prediction parameter thus makes it possible to predict future variation of the liquid temperature with a certain amount of lead time. The invention thus makes it possible in reliable manner to evaluate the duration-to-freezing well before the liquid freezes, and thus to predict the time at which the liquid is going to freeze soon enough in advance to enable the distributor or the client to protect the installation and the meter.

It should be observed that, in the event of the meter including a processor component that incorporates a temperature sensor, e.g. a microcontroller, said temperature sensor can be used in order to produce the air temperature measurements. The invention can thus be performed without adding a new component to the liquid meter, and thus in a manner that is inexpensive.

There is also provided a prediction method as described above, wherein the air temperature prediction parameter is a slope for air temperature as a function of time, and wherein the liquid temperature prediction parameter is a slope for liquid temperature as a function of time.

There is also provided a prediction method as described above, wherein the slope for liquid temperature as a function of time is calculated using the following formula:

$$\Omega = \alpha/X,$$

where $\alpha$ is the slope for air temperature as a function of time and where X is a first constant that depends on the liquid.

There is also provided a prediction method as described above, wherein the liquid is water and wherein the following applies:

$$X = 4.$$

There is also provided a prediction method as described above, including the steps of verifying whether the slope for air temperature as a function of time is positive or negative, and of evaluating the slope for liquid temperature as a function of time only if the slope for air temperature as a function of time is negative.

There is also provided a prediction method as described above, including the steps of comparing air temperature with a predetermined temperature threshold, and of increasing the rate at which temperature measurements are taken if air temperature is less than the predetermined temperature threshold.

There is also provided a prediction method as described above, including the steps of adapting a measurement waiting time between two successive air temperature measurements as a function of at least one risk parameter representative of a risk of freezing.

There is also provided a prediction method as described above, wherein the risk parameter is the slope of liquid temperature as a function of time, and wherein the measurement waiting time T is evaluated from the following formula:

$$T = 1/(\Omega/Y),$$

where $\Omega$ is the slope of liquid temperature as a function of time and where Y is a second constant.

There is also provided a prediction method as described above, wherein the second constant Y lies in the range −0.1° C./minute to −0.3° C./minute.

There is also provided a prediction method as described above that is performed by using an algorithm presenting modular architecture comprising a first module arranged to acquire measurements of air and liquid temperatures and to store said measurements, a second module arranged to calculate the air and liquid temperature prediction parameters and the duration-to-freezing, and a third module arranged to generate an alarm from the duration-to-freezing.

There is also provided a prediction method as described above, wherein the second module is arranged to adapt a measurement waiting time between two successive measurements of air temperature as a function of the liquid temperature prediction parameter, and wherein the first module is arranged to make use of said measurement waiting time.

There is also provided a liquid meter including a pipe in which a liquid flows, a measurement device having a liquid temperature sensor arranged to produce liquid temperature measurements and an air temperature sensor arranged to produce air temperature measurements, and a processor component arranged to perform the prediction method as described above.

There is also provided a liquid meter as described above, wherein the processor component is a microcontroller having the air temperature sensor incorporated therein.

There is also provided a computer program including instructions that cause the processor component of the liquid meter as described above to execute the steps of the prediction method as described above.

There is also provided a computer-readable storage medium, storing the above-described computer program.

The invention can be better understood in the light of the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
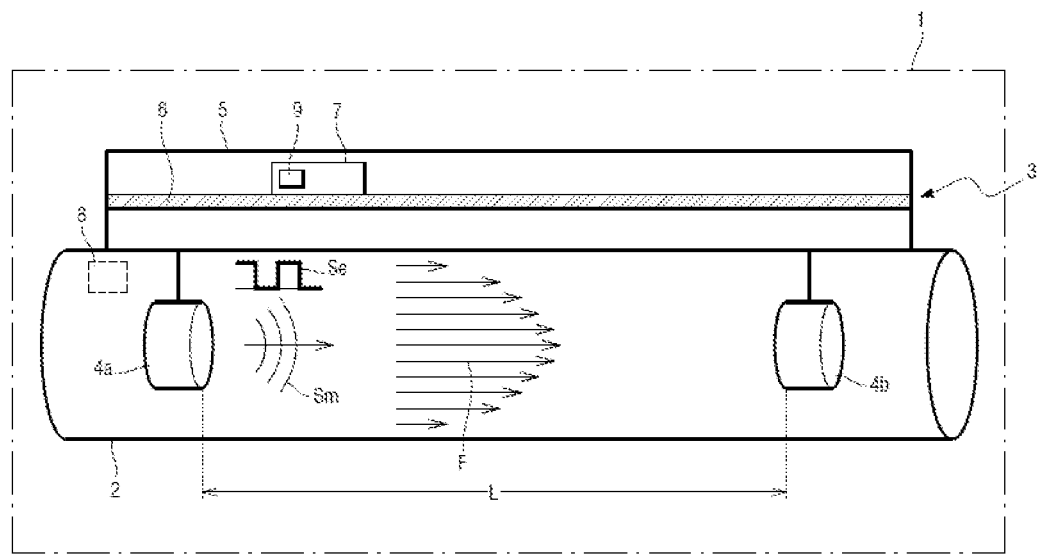
FIG. 1 shows a side view of a water meter in which the invention is performed.

With reference to FIG. 1, in this example, the invention is performed in a liquid meter that is specifically a water meter 1 that is used for measuring the consumption of water supplied by a distribution network to the installation of a client.

The meter 1 comprises firstly a communication module (not shown) that enables the meter 1 to communicate with an information system (IS) of the distributor, possibly via a data concentrator, a gateway, or indeed another meter (such as a district smart meter or an electricity smart meter). The communication module may perform communication of any type, and for example communication via a cellular network of 2G, 3G, 4G, Cat-M, or NB-IoT type, communication using the long range (LoRa) protocol, radio communication using the Wize standard operating at the frequency of 169 megahertz (MHz), etc. At regular intervals, the meter 1 uses the communication module to transmit to the IS the measurements that have been taken.

The meter 1 also comprises both a pipe 2 conveying the flow of water being supplied by the distribution network to the client's installation, and also an ultrasonic measuring device 3.

The water flows in the pipe 2 from upstream to downstream, as represented by the direction of arrows F.

The measuring device 3 comprises both an upstream transducer 4a and a downstream transducer 4b that enable the flow rate of water in the pipe 2 to be measured ultrasonically. The upstream transducer 4a and the downstream transducer 4b are paired. In this example, the upstream transducer 4a and the downstream transducer 4b are piezoelectric transducers.

The measuring device 3 also comprises a measurement module 5 connected to the upstream transducer 4a and to the downstream transducer 4b.

The measurement module 5 includes an electronic card 6 having a processor component 7 that is adapted to execute instructions of a program for performing the prediction method of the invention. The program is stored in a memory that is connected to or incorporated in the processor component 7. In this example, the processor component 7 is a microcontroller, but it could be a different component, e.g. a processor, a digital signal processor (DSP), or indeed a programmable logic circuit such as a field programmable gate array (FPGA) or an application specific integrated circuit (ASIC).

The measuring device 3 also comprises a water temperature sensor 8 that measures the temperature of the water flowing in the pipe 2.

The measuring device 3 also comprises an air temperature sensor 9 that measures the temperature of the air in the meter 1. In this example, the air temperature sensor 9 is incorporated in the microcontroller 7.

The description below begins with a brief description of how the measuring device 3 measures the flow rate of water flowing in the pipe 2 of the meter 1.

The microcontroller 7 controls the upstream transducer 4a and the downstream transducer 4b.

Each of the upstream and downstream transducers 4a and 4b acts in succession to perform the function of an emitter transducer and the function of a receiver transducer.

The microcontroller 7 generates an electrical excitation signal Se and it delivers the electrical excitation signal Se to the emitter transducer. The microcontroller 7 thus causes the emitter transducer to emit an ultrasonic measurement signal Sm. The receiver transducer receives the ultrasonic measurement signal Sm after the ultrasonic measurement signal Sm has travelled through the water along a path of defined length L.

In this example, the path of defined length L is a rectilinear path between the upstream transducer 4a and the downstream transducer 4b. The defined length L is typically equal to 7 centimeters (cm).

In this example, the electrical excitation signal Se is a square wave signal of frequency $f_{us}$ and of period $T_{us}$. In conventional manner, the frequency $f_{us}$ lies in the range 900 kilohertz (kHz) to 4 megahertz (MHz).

When the emitter transducer is the upstream transducer 4a, the ultrasonic measurement signal Sm thus travels between the upstream transducer 4a and the downstream transducer 4b from upstream to downstream along the path of defined length L. The receiver transducer (downstream transducer 4b) then acquires the ultrasonic measurement signal Sm and produces an electrical measurement signal.

When the emitter transducer is the downstream transducer 4b, the ultrasonic measurement signal Sm travels between the downstream transducer 4b and the upstream transducer 4a from downstream to upstream along the path of defined length L. The receiver transducer (upstream transducer 4a) then acquires the ultrasonic measurement signal Sm and produces an electrical measurement signal.

The measuring module 5 digitizes the electrical measurement signals. The microcontroller 7 acquires the digitized electrical measurement signals and measures a global transfer time TAB from the upstream transducer 4a to the downstream transducer 4b, and a global transfer time TBA from the downstream transducer 4b to the upstream transducer 4a.

The microcontroller 7 uses the global transfer times TAB and TBA to determine the differential time-of-flight DToF.

Since the DToF is proportional to the mean speed of the water, the microcontroller 7 can then calculate the mean speed of the water by using the DToF. The mean speed is signed and it may be positive, negative, or zero.

The microcontroller 7 then deduces the mean flow rate of the water flowing in the pipe 2 of the meter 1.

The measuring device 3 also serves to predict freezing of the water in anticipated manner.

It has been observed that, when there is a decrease in the temperature of the ambient surroundings in which the meter 1 is located, the temperature of the air in the meter 1 decreases more quickly than the temperature of the water flowing in the pipe 2 of the meter 1. Variation in the temperature of the water is thus slow in comparison with variation in the temperature of the air. This is due to the difference in thermal inertia between the two media (water and air). It is estimated that the thermal inertia of water is about four times higher than that of air.

Figure 2:
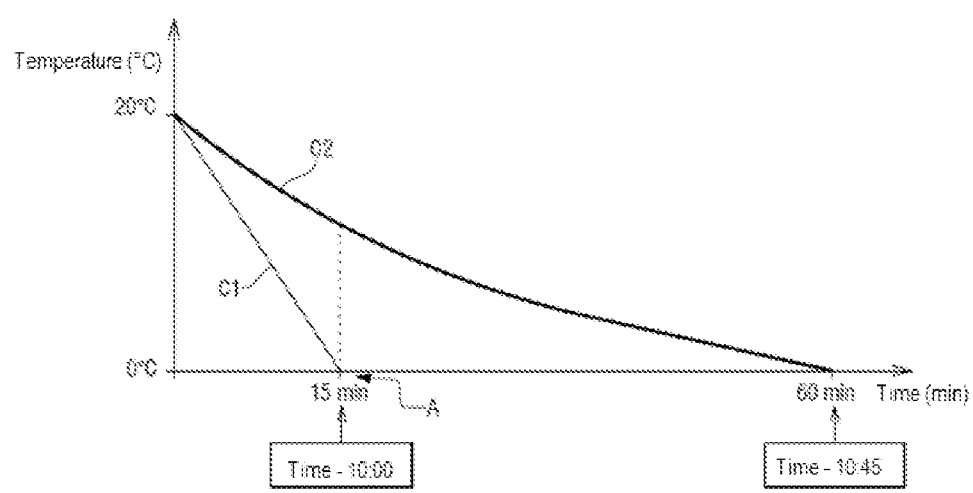
FIG. 2 is a graph showing curves for air temperature variation as a function of time (C1) and for water temperature variation as a function of time (C2)

Thus, in the example of FIG. 2, it can be seen that while the temperature of the air in the meter 1 (curve C1) as measured by the air temperature sensor 9 takes 15 minutes to go from 20° C. to 0° C., the temperature of the water in the pipe 2 as measured by the water temperature sensor 8 takes 60 minutes to go from 20° C. to 0° C. In this example, the temperature of the air reaches 0° C. at 10 AM, while the temperature of the water reaches 0° C. at 10:45 AM. The temperature of the water thus reaches the temperature of the air only after 45 minutes (thermal equilibrium).

The invention makes use of this time offset that results from the difference in thermal inertia between the two media. The invention consists in evaluating how the temperature of the air varies in order to predict in anticipated manner how the temperature of the water is going to vary, and in particular in order to predict in anticipated manner the time at which the water is going to freeze.

The difference in thermal inertia thus makes it possible to predict the time at which the water is going to freeze and to generate an alarm before freezing takes place and early enough to enable the distributor or the client to take action to protect the meter 1 and the installation to which the meter 1 is connected.

In this example, the alarm may be generated at 10 AM (at time A) by specifying that the time of freezing is going to be 10:45 AM. The meter thus gives the distributor or the client a warning 45 minutes before the risk of freezing. The alarm message may be incorporated in a frame transmitted by the communication module of the meter 1.

Figure 3:
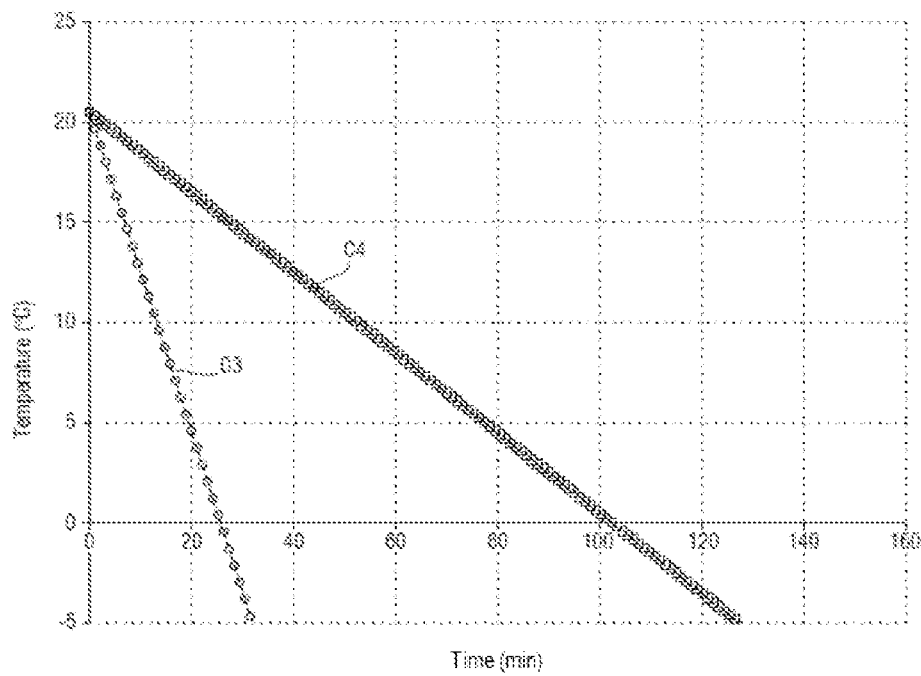
FIG. 3 is a graph similar to the graph of FIG. 2, with the temperature variation of water as a function of time being approximated by a linear function.

With reference to FIG. 3, the variation of the temperature of the air as a function of time may be approximated by a linear function C3.

Example of FIG. 3, this linear function has the following equation:

$$y=-0.8x+20.5;$$

where y is the temperature in ° C. and x is time (in minutes)

The temperature of the air thus goes from 20.5° C. to 0° C. in about 26 minutes.

Likewise, the variation of the temperature of the water as a function of time may be approximated by a linear function C4.

Example of FIG. 3, this linear function has the following equation:

$$y=-0.2x+20.5.$$

The temperature of the water thus goes from 20.5° C. to 0° C. in about 102 minutes.

Figure 4:
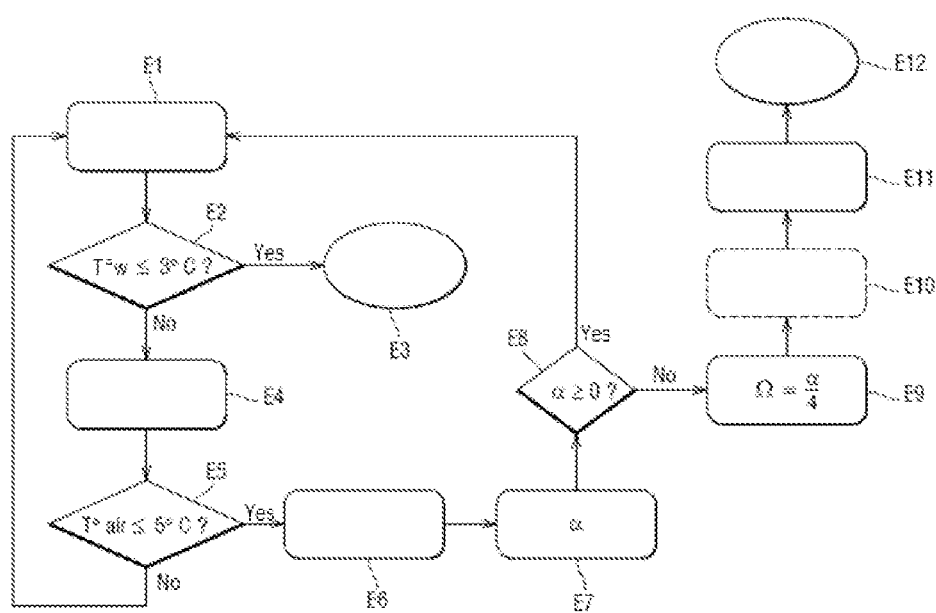
FIG. 4 shows steps of the prediction method in a first implementation of the invention.

With reference to FIG. 4, there follows a more precise description of how the prediction method is performed in a first implementation of the invention. The various steps of the prediction method are described in sequence.

The microcontroller 7 acquires the measurements of the temperature of the water flowing in the pipe 2 (step E1). The measurements of this water temperature are produced by the water temperature sensor 8.

The microcontroller 7 compares the water temperature T° w with a first predetermined threshold, which is equal to 3° C. in this example (step E2). If the water temperature is less than (specifically less than or equal to) the first predetermined threshold, then an alarm is generated immediately (step E3). The alarm warns that a risk of freezing is imminent.

If the water temperature T° w is greater than (specifically strictly greater than) the first predetermined temperature threshold, then the microcontroller 7 acquires measurements of the temperature T° air of the air in the meter 1 (step E4). The measurements of this air temperature T° air are produced by the air temperature sensor 9 incorporated in the microcontroller 7.

The microcontroller 7 compares the air temperature with a second predetermined threshold, which is equal to 5° C. in this example (step E5). If the air temperature is greater than (specifically strictly greater than) the second predetermined temperature threshold, there is no risk of freezing in the short term and the method returns to step E1.

If the air temperature is less than (specifically less than or equal to) the second predetermined temperature threshold, then the method moves on to step E6.

In step E6, given the air temperature, there exists a risk of the water freezing: the rate at which air temperature measurements are taken is increased. The rate at which water temperature measurements are taken may also be increased.

From the air temperature measurements, the microcontroller 7 evaluates a prediction parameter for the air temperature, which parameter is representative of future variation of the air temperature (step E7). In this example, the air temperature prediction parameter is a slope α for the air temperature as a function of time.

In this example, the slope α is expressed in ° C./minute.

The slope α is measured during a measurement time window β, as follows. The measurement window β has a plurality of measurement points. For each successive pair of measurement points, the slope is calculated of the straight line segment joining said successive measurement points.

The slope α is equal to the average over the measurement window β of the slopes of said straight line segments. By way of example, the measurement window β has a duration equal to 5 minutes.

The microcontroller 7 then verifies whether the slope α is positive or negative: the slope α is thus compared with a zero slope equal to 0° C./minute (step E8).

If the slope α is positive (specifically positive or zero), i.e. if the air temperature is constant or is increasing, then there is no risk of freezing in the short term and the prediction method returns to step E1.

If the slope α is negative (specifically strictly negative), i.e. if the air temperature is decreasing, then the prediction method moves on to step E9.

In step E9, the microcontroller 7 uses the air temperature prediction parameter to evaluate a prediction parameter for the water temperature, which parameter is representative of future variation of the water temperature. In this example, the water temperature prediction parameter is a slope Ω for the water temperature as a function of time. The slope Ω is thus calculated from the slope α. The microcontroller 7 evaluates the slope Ω only if the slope α is negative.

The slope Ω is also expressed in ° C./minute.

In this example, the following formula is used:

$$\Omega = \alpha/X;$$

where X is a first constant that depends on the fluid flowing in the pipe 2. In this example, the fluid is water, so:

$$X=4.$$

The water temperature is then measured again (step E10, where this step is optional since the water temperature was already measured in step E1).

The microcontroller 7 uses the slope Ω to estimate a duration-to-freezing, i.e. the length of time from the present instant to the instant at which there is a risk of the water freezing (step E11).

In this example, the instant at which there is a risk of the water freezing is defined as the instant at which the temperature of the water becomes less than (specifically less than or equal to) a third predetermined temperature threshold, specifically equal to 3° C.

The duration-to-freezing is expressed in minutes.

An alarm is then generated, giving both the duration-to-freezing and the estimated time at which the water is going to freeze (step E12).

Figure 5:
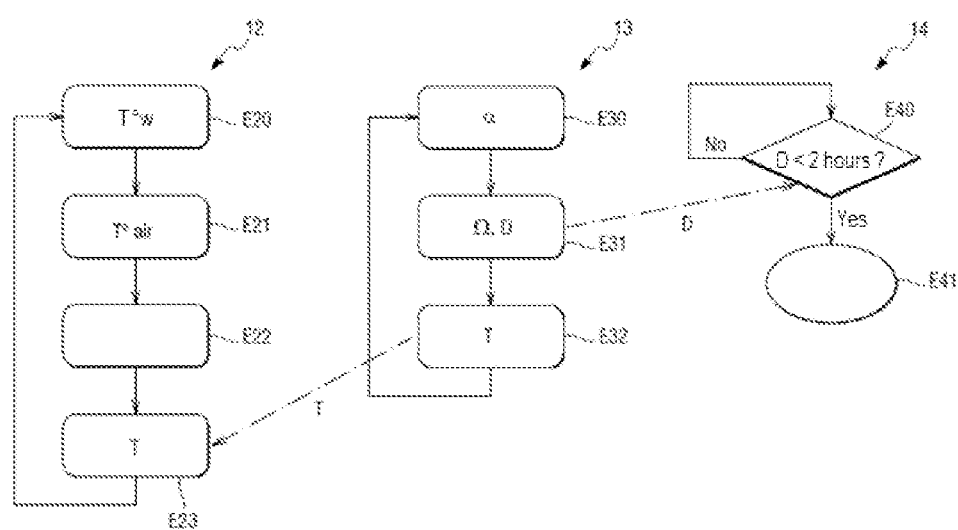
FIG. 5 shows steps of the prediction method in a second implementation of the invention.

With reference to FIG. 5, there follows a more precise description of how the prediction method is performed in a second implementation of the invention.

The prediction method is performed by making use of an algorithm presenting modular architecture comprising a first module 12 (measurement acquisition module) arranged to acquire measurements of air and water temperatures and to store said measurements, a second module 13 (risk estimator module) arranged to calculate the air and water temperature prediction parameters and the duration-to-freezing, and a third module 14 (alarm decision module) arranged to generate an alarm from the duration-to-freezing.

The three modules exchange data, but they are independent from one another.

During execution of the first module 12, the microcontroller 7 begins by acquiring a measurement of the water temperature T° w (step E20).

Thereafter, the microcontroller 7 acquires a measurement of the air temperature T° air (step E21).

The measurements of the water and air temperatures are then stored in a measurement table (step E22). The size of the measurement table corresponds to the number of measurements taken during a measurement window β. In this example, it is assumed that the rate at which water temperature measurements are taken is equal to the rate at which air temperature measurements are taken, such that the measurement table contains as many water temperature measurements as it contains temperature measurements.

It is not essential for the rate at which water temperature measurements are taken to be equal to the rate at which temperature measurements are taken. In particular, it would be possible to make provision for air temperature measurements to be taken at a rate that is higher than the rate at which water temperature measurements are taken.

The microcontroller 7 then waits during a measurement waiting time T (step E23).

After the measurement waiting time T, the first module 12 returns to step E20.

The measurement waiting time T thus corresponds to the time between taking two successive air temperature measurements (and in this example also the time between taking two successive water temperature measurements).

The measurement waiting time T is thus equal to the reciprocal of the rate at which measurements are taken of the air and water temperatures.

During execution of the second module 13, the microcontroller 7 extracts the temperature measurements from the measurement table and calculates the slope α for air temperature as a function of time over the measurement window β (step E30).

The microcontroller 7 then calculates the slope Ω from the slope α by using the following formula:

$$\Omega = \alpha/4 \qquad \text{(step E31)}.$$

The microcontroller 7 uses the slope Ω to estimate the duration-to-freezing D between the present instant and instant when the water risks freezing.

The microcontroller 7 then calculates a parameter representative of the risk of freezing, and it adapts the measurement waiting time T, and thus the rate at which temperature measurements are taken, as a function of this parameter (step E32).

In this example, the parameter that is representative of the risk of freezing is the slope Ω. The greater (in absolute value) the slope Ω, the higher the risk of freezing. The second module 13 thus adapts the measurement waiting time as a function of the water temperature prediction parameter.

The new measurement waiting time T is then injected into the first module 12, which make use of this new measurement waiting time while it is executing.

When the risk increases, i.e. when the slope Ω is negative and its absolute value increases, the microcontroller 7 shortens the measurement waiting time T and thus increases the rate at which temperature measurements are taken (and thus the rate at which water temperature measurements are taken).

In contrast, when the risk decreases, the microcontroller 7 lengthens the measurement waiting time T and thus decreases the rate at which temperature measurements are taken (and thus the rate at which water temperature measurements are taken).

This procedure serves to optimize both the accuracy of the measurements and also the electricity consumption of the measurement device 3 and thus of the meter 1. Specifically, electricity consumption is a critical parameter, since the meter 1 in this example is battery powered and its electricity consumption needs to be limited. Increasing the rate at which measurements are taken leads to an increase in the electricity consumption of the measurement device 3.

It is thus very advantageous to increase the rate at which measurements are taken while the risk is high, so as to provide an accurate estimate of the duration-to-freezing and so as to avoid false alarms, and to decreases the rate when the risk is low, since there is then no longer any need to take measurements at a high rate. Reducing the rate at which measurements are taken serves to reduce electricity consumption.

The measurement waiting time T is evaluated using the following formula:

$$T=1/(\Omega/Y);$$

where Y is a second constant.

Advantageously, the second constant Y lies in the range −0.1° C./minute to −0.3° C./minute. In this example, the second constant Y is equal to −0.2° C./minute.

The second constant is a reference value that makes it possible, for the water temperature varying from 20° C. to 0° C. over 100 minutes, to obtain a measurement waiting time T equal to 1 second. Under such conditions, this measurement waiting time T is an optimum value that enables an accurate estimate to be obtained of the duration-to-freezing but without taking measurements at a rate that is too high, which would penalize the electricity consumption budget of the measurement device 3 and thus of the meter 1.

It should be observed that the measurement waiting time is bounded between a maximum value (equal to 1 second in this example) and a minimum value (equal to 0.1 second in this example). This serves to avoid the formula for the measurement waiting time as a function of the slope Ω generating measurement waiting times that are too long or too short.

The second module 13 then returns to step E30.

The third module 14 acquires the duration-to-freezing D from the second module 13 and compares it with a predetermined time threshold (step E40). In this example, the predetermined time threshold is equal to 2 hours (h).

If the duration-to-freezing D is greater than (specifically greater than or equal to) the predetermined time threshold, then an alarm is generated during the duration-to-freezing and the estimated time of the water freezing (step E41).

Otherwise, the third module 14 loops back to step E40.

Naturally, the invention is not limited to the embodiments described, but covers any variant coming within the ambit of the invention as defined by the claims.

The invention is not necessarily performed in an ultrasonic meter, but could be performed in any type of meter (e.g. a mechanical meter) that is capable of measuring the temperature of the liquid.

The invention can be implemented in a meter for a liquid other than water, e.g. in an oil meter. The invention can also be implemented in a thermal energy meter.

The various steps of the prediction method need not necessarily all be performed in the meter. For example, provision can be made for the meter to take the air and water temperature measurements and transmit them to remote equipment (a data concentrator, a server, etc.) that then estimates the duration-to-freezing, and generates an alarm where necessary.

The air temperature sensor need not necessarily be incorporated in a microcontroller; the processor component in which the invention is performed (in full or in part) and the air temperature sensor could be distinct components.

The air temperature prediction parameter need not necessarily be a slope, but could be a different parameter, e.g. one or more values of a non-constant derivative function (when air temperature variation is not linear), or indeed a duration between the present instant and an instant at which the air temperature is going to reach a predetermined threshold, etc. The prediction parameter could also be a function of a plurality of parameters.

This is also true for the water temperature prediction parameter.

Likewise, the risk parameter and need not necessarily be the slope of the water temperature as a function of time, but could be a different parameter: air temperature slope, duration-to-freezing, etc. The risk parameter could also be a function of a plurality of parameters.

The invention claimed is:

1. A prediction method for predicting freezing of a liquid flowing in a pipe of a liquid meter, wherein the liquid meter is used for measuring the consumption of liquid supplied by a distribution network to an installation of a client, the method comprising the steps of:
acquiring measurements of air temperature in the liquid meter;
from the air temperature measurements, evaluating an air temperature prediction parameter representative of future variation of the air temperature;
from the air temperature prediction parameter, evaluating a liquid temperature prediction parameter representative of future variation of liquid temperature;
using the liquid temperature prediction parameter to estimate a duration-to-freezing between a present instant and an instant at which the liquid risks freezing;
generating an alarm if the duration-to-freezing is less than a predetermined time threshold.

2. The prediction method according to claim 1, wherein the air temperature prediction parameter is a slope for the air temperature as a function of time, and wherein the liquid temperature prediction parameter is a slope for the liquid temperature as a function of time.

3. The prediction method according to claim 2, wherein the slope for the liquid temperature as a function of time is calculated using the following formula:

$$\Omega = \alpha/X,$$

where α is the slope for the air temperature as a function of time and where X is a first constant that depends on the liquid.

4. The prediction method according to claim 3, wherein the liquid is water and wherein the following applies:

$$X=4.$$

5. The prediction method according to claim 2, comprising the steps of verifying whether the slope for the air temperature as a function of time is positive or negative, and of evaluating the slope for the liquid temperature as a function of time only if the slope for the air temperature as a function of time is negative.

6. The prediction method according to claim 2, comprising the steps of comparing the air temperature with a predetermined temperature threshold, and of increasing a rate at which the air temperature measurements are taken if the air temperature is less than the predetermined temperature threshold.

7. The prediction method according to claim 2, comprising the step of adapting a measurement waiting time between two successive air temperature measurements as a function of at least one risk parameter representative of a risk of freezing.

8. The prediction method according to claim 7, wherein the risk parameter is the slope of the liquid temperature as a function of time, and wherein the measurement waiting time T is evaluated from the following formula:

$$T=1/(\Omega/Y);$$

Where $\Omega$ is the slope of the liquid temperature as a function of time and where Y is a second constant.

9. The prediction method according to claim 8, wherein the second constant Y lies in the range 0.1° C./minute to 0.3° C./minute.

10. The prediction method according to claim 1 that is performed by using an algorithm presenting modular architecture, comprising the steps of:
    acquiring measurements of air and liquid temperatures and storing said measurements;
    calculating the air and liquid temperature prediction parameters and the duration-to-freezing; and
    generating an alarm from the duration-to-freezing.

11. The prediction method according to claim 10, further comprising the steps of adapting a measurement waiting time between two successive measurements of the air temperature as a function of the liquid temperature prediction parameter, and making use of said measurement waiting time.

12. A liquid meter, comprising:
    a pipe in which a liquid flows;
    a measurement device having a liquid temperature sensor arranged to produce liquid temperature measurements and an air temperature sensor arranged to produce air temperature measurements in the liquid meter; and
    a processor component arranged to perform the prediction method according to claim 1.

13. The liquid meter according to claim 12, wherein the processor component is a microcontroller having the air temperature sensor incorporated therein.

14. A non-transitory computer readable storage medium having stored thereon a computer program including instructions for causing a processor component of a liquid meter to execute a prediction method for predicting freezing of a liquid flowing in a pipe of the liquid meter, wherein the liquid meter is used for measuring the consumption of liquid supplied by a distribution network to an installation of a client, the method comprising the steps of:
    acquiring measurements of air temperature in the liquid meter;
    from the air temperature measurements, evaluating an air temperature prediction parameter representative of future variation of the air temperature;
    from the air temperature prediction parameter, evaluating a liquid temperature prediction parameter representative of future variation of liquid temperature;
    using the liquid temperature prediction parameter to estimate a duration-to-freezing between a present instant and an instant at which the liquid risks freezing;
    generating an alarm if the duration-to-freezing is less than a predetermined time threshold.

* * * * *